March 2, 1937.  E. G. STACK  2,072,843
FLEXIBLE COUPLING
Filed May 18, 1936
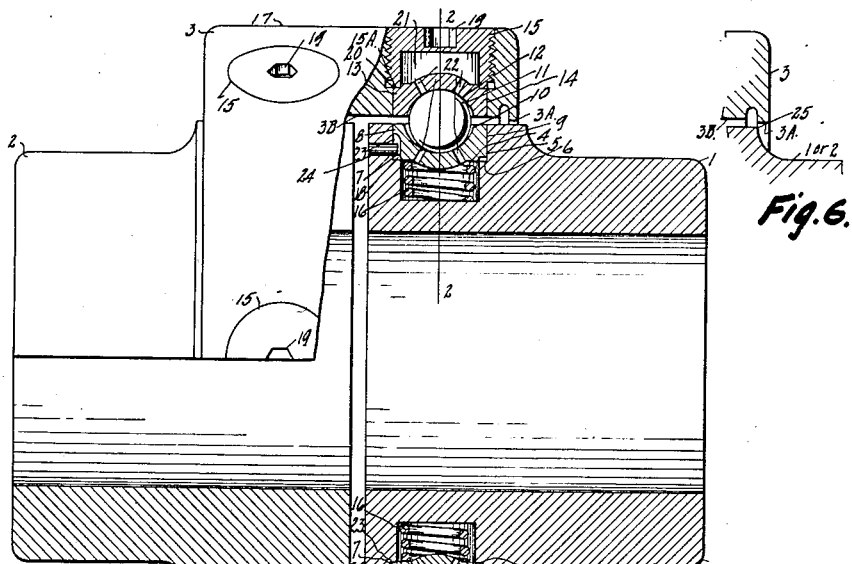
Fig. 6.
Fig. 1.
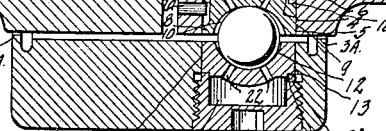
Fig. 4.
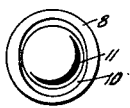
Fig. 5.
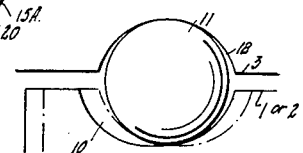
Fig. 3.
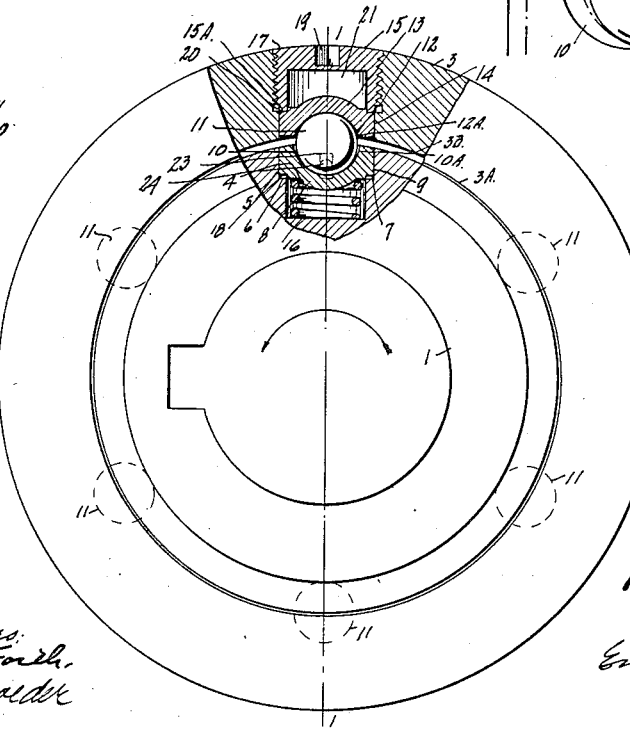
Fig. 2.
Witnesses:  Emmett G. Stack
Inventor Patented Mar. 2, 1937

2,072,843

UNITED STATES PATENT OFFICE 2,072,843

FLEXIBLE COUPLING

Emmet G. Stack, Marshfield, Oreg.

Application May 18, 1936, Serial No. 80,321

7 Claims. (Cl. 64—15)

My invention relates to an improved type of coupling in which power is transmitted from a driving hub to a driven hub by a floating encircling ring thru driving means interposed between the hubs and the ring in combination with resilient members to float the ring.

An object is to provide a coupling that is truly flexible, that is very sensitive in absorbing shock and damping out vibration, that automatically adjusts itself to parallel and angular mis-alignment, that allows free end float of the shafts connected when under load, that may be assembled quickly and easily and when once assembled may be disassembled without moving the shafts or contacting other structures, that may be of smaller and lighter construction for a given capacity, that is cheap, simple, and of safe design.

I accomplish the objects set forth in the new and novel manner hereinafter described and illustrated in the accompanying drawing. Thruout this description and drawing similar numerals refer to similar parts.

Fig. 1 is a side view partially in section on the line 1—1 of Fig. 2; Fig. 2 is an end view partially in section on the line 2—2 of Fig. 1; Fig. 3 is a diagrammatic view showing the end float of a shaft; Fig. 4 is a bottom view of the ring bushing; Fig. 5 is a top view of the hub bushing; Fig. 6 shows a method of providing for greater misalignment by forming a hub with an enlarged central portion and the ring overhanging this enlarged portion.

The structure of both the driving and driven parts of a coupling may be similar. The hub 1 is adapted to be secured to the shaft of the driving unit and the hub 2 to the shaft of the driven unit—neither the units nor their shafts are shown. The ring 3 encircles the hubs 1 and 2. Its part 3A is bored to fit the periphery of the hubs 1 and 2 as closely as possible, so as to keep out dirt and keep grease in, and yet permit reasonable parallel or angular mis-alignment. Closer proximity of the part 3A with the hubs 1 and 2, than would otherwise be possible, is brought about by providing the counterbore 3B of the ring 3. By making the width of the ring 3 equal to or less than the length of one of the hubs 1 or 2, the ring 3 may be slipped sideways sufficiently to permit, for instance, the removal of the driving unit or its shaft without disturbing the driven unit, or vice versa.

In the periphery of each of the hubs 1 and 2 are milled a number of the cylindrical holes 4, each in radial alignment with the axis of rotation. These holes 4 are formed with a counterbored portion 5 so as to provide the shoulder 6 upon which may come to rest the seat 7 formed on the bottom face of the cylindrical bushing 8 whose body portion 9 is adapted for a snug sliding fit in the counterbored portion 5. Into the top face of the bushings 8 are milled the ball seats 10 which are curvilineal in form circumferentially but of a length equal to the diameter of the hardened steel ball 11 employed, plus the end float desired for the driving or driven shaft. The number of balls 11 employed depends upon their size and the desired capacity of the coupling in which they are used. It is preferable to use an even number so that one ball may have another ball spaced diametrically opposite so that one may have an equalizing effect upon the other at all times. The upper or outer seat 12 for each ball 11 is formed in the bushing 13 which is in general similar to the bushing 8 and a snug sliding fit in the hole 14 provided for it in the ring 3. This seat 12 is also curvilineal in form circumferentially and elongated similar to the seat 10 if end float is to be provided, though to less extent since it is also desirable to have the ball return to a normally central position when the force tending to move it from that position is removed. In other words, the ball under extreme movement must move its bushing upwardly or it must move downwardly itself. The upward movement of the bushing 13 is limited by the cover-plate 15 provided with threads and screwed into the upper portion of the hole 14 adapted to receive it. The downward movement of the ball may be had since the bushing 8 is mounted on the compression spring 16 positioned in the hole 4. When the cover-plate 15 is brought flush with the periphery 17 of the ring 3, the spring 16 which it acts upon receives an initial compression. It is desirable that all of the springs 16 be compressed equally and when so compressed provide like gaps 18 between the shoulders 6 and the seats 7 on the bushings 8. The drawing shows the employment of a counter-sunk seat 19 for the reception of a wrench that may be used to position the shoulder 15A against the seat 20 on the bushing 13 or to remove the cover-plate 15 when disassembling the coupling. The cover-plates 15 are provided with the chambers 21 which, together with the holes 4, may be packed with grease for the lubrication of the balls and their bushings—suitable means such as the holes 22 being provided for its distribution. While the use of springs has been shown, other resilient means might be employed and under some conditions, for instance, rubber, natural or synthetic. If rubber is used it is desirable to protect it from oil and grease.

I have shown and described the positioning of the resilient means, or the springs 16 in the hubs 1 and 2 but it may be pointed out, without further illustration, that the resilient means may be positioned in the chambers 21. When they are so positioned and under initial compression, the seats 7 should be riding the shoulders 6 and a gap, similar to the gap 18, should exist between the shoulders 15A and the seats 20 on the bushings 13.

The coupling, as I have shown and described it, will work when rotated in either direction, but I have indicated one direction and shall base my description of the action of the elements when the coupling is turned over in that direction.

The curve of the seat 10 is so constructed that when the hub 1 is turned in the direction indicated, the ball 11 seated in it, will roll backwardly as it is moved forwardly and incidently tend to climb upwardly, but since the bushing 13 is held against upward movement and the bushing 8 may be forced downwardly, the ball 11 adjusts itself to both of its seats 10 and 12 until the possible maximum contact is had with each. This point is reached at the instant the part 10A of the seat 10 comes into contact with the ball 11. At this point the downward movement of the ball is arrested and the ring 3 turns with the hub 1. When the ring 3 begins to turn, a ball 11, carried in its seat 10 in the hub 2, is rolled forwardly and incidently must move downwardly which it may do since the resilient member 16 associated with it may be stressed beyond its initial compression. This downward movement continues until the possible maximum contact is reached between the ball 11 and its seats 10 and 12, at which time the hub 2 turns with the ring 3. This point is reached when the part 12A of the bushing 12 comes into contact with the ball 11. The downward movement of the bushings 8 and the degree of compression in their respective resilient members 16 will vary in proportion to the force or power necessary to turn the driven hub 2 at any time. This fact makes possible the ready absorption of shock and the damping out of vibration.

Since nothing rolls like a ball the employment of balls makes possible the universal adjustment, without cramping, of the coupling elements due to parallel or angular misalignment. This fact makes possible a truly flexible coupling. Since a ball will roll under practically all loadings which do not crush it, the free end float of the shafts of the driving and driven units is assured at all times.

Where ordinary cast iron or other relatively soft material is used for the hubs 1 and 2, it is imperative, for efficiency, that both the upper and lower bushings 8 and 13 be used, but where steel is employed it is possible for the seats 10 to be formed directly in the hubs 1 and 2—the resilient members as the springs 16 being positioned in the ring 3—and case-hardened. I believe it more desirable, however, to use bushings in both the hubs and ring regardless of what they are made of, since the bushings may be more readily heat-treated and may be easily and cheaply replaced if worn or damaged. It is very desirable that the bushings have a glass-hard polished seat for the balls 11, and a backing tough enough to stand all shock. Where considerable end play is to be taken care of, the lower bushing 8, especially, should be kept from turning. As a means for accomplishing this, I have provided a slot 23 in the body portion 9 of the bushing 8 into which is projected the guide pin 24. Where there is apt to be considerable misalignment, the ring 3 may be made to overhang the raised portion 25 of the hubs 1 and 2, as shown in Fig. 6. In developing the curves for the seats 10 and 12 circumferentially, a line contact should be provided for the balls 11 when the coupling is working under load rather than a point contact. The drawing shows the use of a single spring 16, whereas a nest of springs might be desirable or necessary to meet a condition. It is quite evident, from the above, that it is possible to vary the design of the coupling without departing from the basic principle and so I do not limit my invention to the exact design shown. So therefore, having described my invention so that anyone skilled in the art may readily employ the basic principle in making a flexible coupling, I claim:

1. In a flexible coupling, in combination, a driving hub, a driven hub, a floating ring encircling the hubs, balls for locking elements between the periphery of each hub and the ring, and resilient means in radial alignment with the balls adapted to float the ring.

2. In a flexible coupling, in combination, a driving hub, a driven hub, a floating ring encircling the hubs of less width than the length of at least one of the hubs, balls for locking elements between the periphery of each hub and the ring, and resilient means in radial alignment with the balls adapted to float the ring.

3. In a flexible coupling, in combination, a driving hub, a driven hub, a floating ring encircling the hubs having its proximate face thereto relieved to form depending edges, balls for locking elements between the periphery of each hub and the ring, and resilient means in radial alignment with the balls adapted to float the ring.

4. In a flexible coupling, in combination, a driving hub, a driven hub, a floating ring encircling the hubs, balls for locking elements between the periphery of each hub and the ring, a pair of opposed seats for each ball, one carried by a hub and one by the ring, in which the rolling movement of the ball is limited, resilient means in radial alignment with the balls, and means to put the resilient means under initial compression to float the ring, said resilient means being arranged and adapted to be further compressed upon circumferential movement of the balls.

5. In a flexible coupling, in combination, a driving hub, a driven hub, a floating ring encircling the hubs, balls for locking elements between the periphery of each hub and the ring, a pair of opposed seats for each ball, one carried by a hub and one by the ring, in which the rolling movement of the ball is limited, resilient means in radial alignment with the balls, means to put the resilient means under initial compression to float the ring, said resilient means being arranged and adapted to be further compressed upon circumferential movement of the balls, and means to limit the compression of the resilient means.

6. In a flexible coupling, in combination, a driving hub, a driven hub, a floating ring encircling the hubs, a plurality of radial holes in the periphery of each hub, a hole in the ring for each hub hole positioned in radial alignment therewith, a bushing radially slidable in each hub hole, resilient means positioned in a hub hole beneath the bushing, a bushing radially adjustable in each ring hole and adapted to form with a hub bushing a cooperating pair, a depression formed in the opposing faces of each pair member, a ball restrained between said depressions, said depressions having configurations adapted to permit independent adjustment of each ball to changes in load on the driving and driven hub and in position and alignment thereof, and means to adjust the ring hole bushings to provide for the initial compression of the resilient means to float the ring, said resilient means being arranged and adapted to further compression in reacting to said changes.

7. In a flexible coupling, in combination, a driving hub, a driven hub, a floating ring encircling the hubs, balls for locking elements between the periphery of each hub and the ring, a pair of opposed seats for each ball, one carried by the hub and one by the ring, said seats having a greater curvature than the ball circumferentially with the maximum curvature extended laterally, resilient means to back one member of each pair, and means for putting the resilient means under initial compression to float the ring, each of said resilient means being arranged and adapted to be acted upon for further compression thru movement of its associated ball rolling circumferentially in its seats.

EMMET G. STACK.